INVENTOR.
BY ELBRIDGE M. SMITH

June 20, 1967  E. M. SMITH  3,325,979
DUST COLLECTOR

Filed March 18, 1964  3 Sheets-Sheet 2

INVENTOR.
BY ELBRIDGE M. SMITH

INVENTOR.
BY ELBRIDGE M. SMITH

United States Patent Office 3,325,979
Patented June 20, 1967

3,325,979
DUST COLLECTOR
Elbridge M. Smith, Bethlehem, Pa., assignor to
Fuller Company
Filed Mar. 18, 1964, Ser. No. 352,751
10 Claims. (Cl. 55—302)

The present invention relates to the method and apparatus for filtering of dust and pollutants from gases, and is more particularly concerned with the cleaning of filters for high temperature gases.

The need for effective cleaning of dust collector filter bags is well recognized; however, many problems are present in providing an apparatus and method for efficiently carrying out dust removal. Among them is included the problem of filter bag failure or fatigue, which occurs from either continued use of the filter bag within the particular environmental conditions of the filter system, or from the particular device or method chosen to loosen the clinging dust particles from the bag.

When early fatigue is a problem in a filter bag system indirect or non-mechanical shakers utilizing sound waves and/or the flowing of air currents within the bag have been preferred, because of their more gentle and more uniform distribution of energy to the fabric.

U.S. Patent No. 2,201,520, issued May 21, 1940, to W. S. Callahan, discloses a filter system wherein the bags are shaken by reciprocating the frame which supports the bags, and by the application of air admitted into the bags. From such a system the useful life of the bags might be greatly reduced, due to mechanical fatigue.

U.S. Patent No. 3,053,031, issued Sept. 11, 1962, to W. D. Vedder et al. describes a device for cleaning of dust filters by the utilization of sound waves. This system requires a complicated and expensive individual sound generator associated with each filter bag, and further calls for mechanical twisting under certain circumstances.

U.S. Patent No. 1,163,318, issued Dec. 7, 1915, to A. D. Bryant, also discloses a non-mechanical shaker; however, this device also has not proven entirely satisfactory, since it also wears the filter bag because of the periodic application of air blasts directly against fixed points on the inside of the filter bag, perpendicular to the bag surface.

In general, the preferred form of the present invention comprises a dust collector having at least one tubular filter bag positioned substantially vertically and having an open lower end. A dust discharge chamber is positioned adjacent the lower end of the filter bag and communicates therewith. Also communicating with the filter bag is a gas flow means for passing a stream of dirty gas to the interior of the bag and for discharging filtered gas from the bag. The apparatus is provided with a means for periodically interrupting the flow of dirty gas into the interior of the bag. Means are also provided to propel a volume charge of gas up into the filter bag during the period of interrupted flow of dirty gas. A confining means is located at the upper end of the bag to redirect the volume charge toward the lower end of the bag to aid in removal of dislodged dust to the discharge chamber.

The present invention, by a gentle but effective action of a volume charge of gas rising within the filter bag, and by the gentle action of the gas redirected by the upper end of the filter bag, provides an efficient but gentle operation for cleaning of the filter bags.

A better understanding of the invention may be derived from the following description and accompanying drawings, in which.

Figure 1:
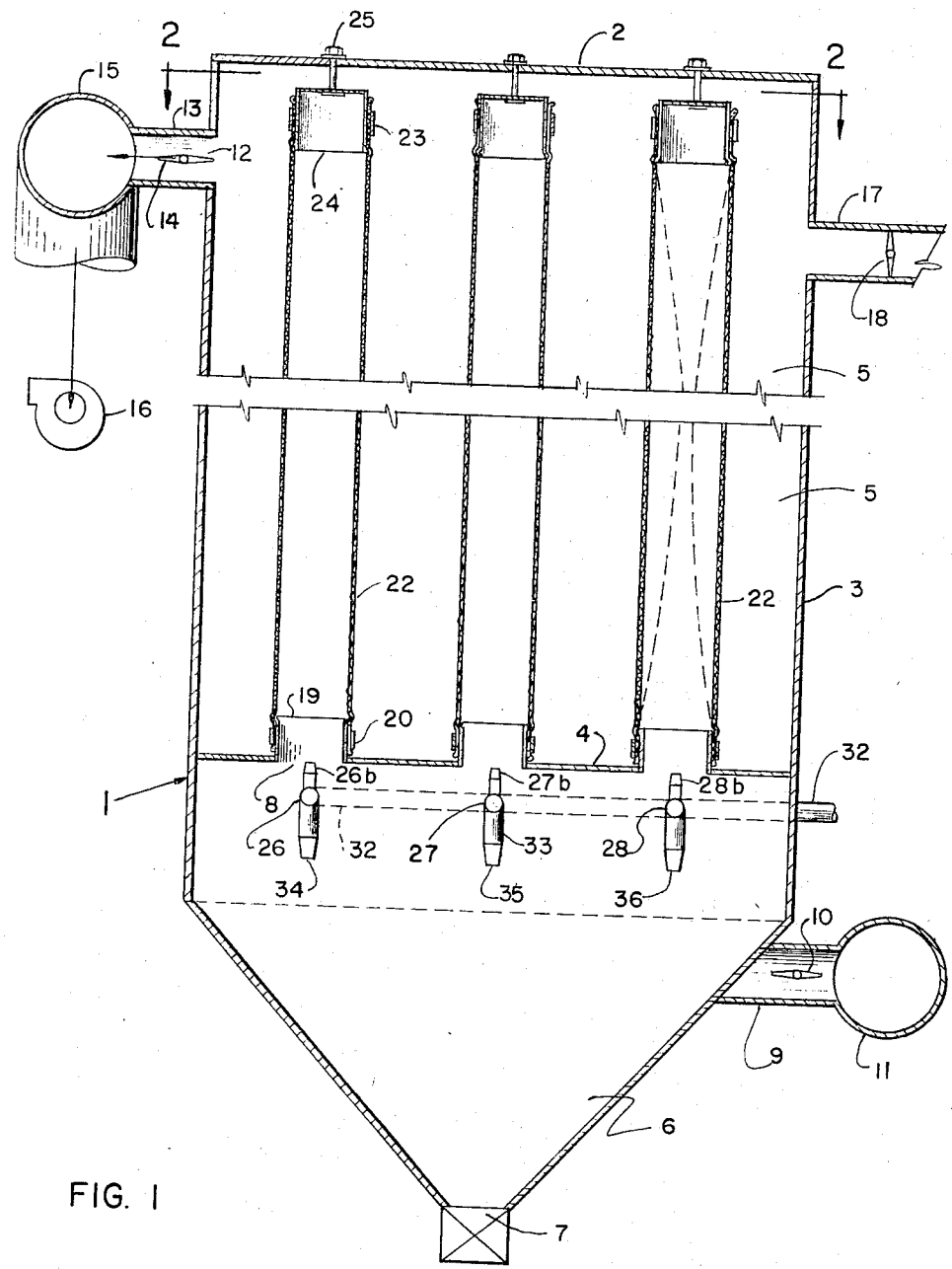
FIG. 1 is an elevation, in section, of the preferred form of the invention taken along line 1—1 of FIG. 2.
Figure 3:
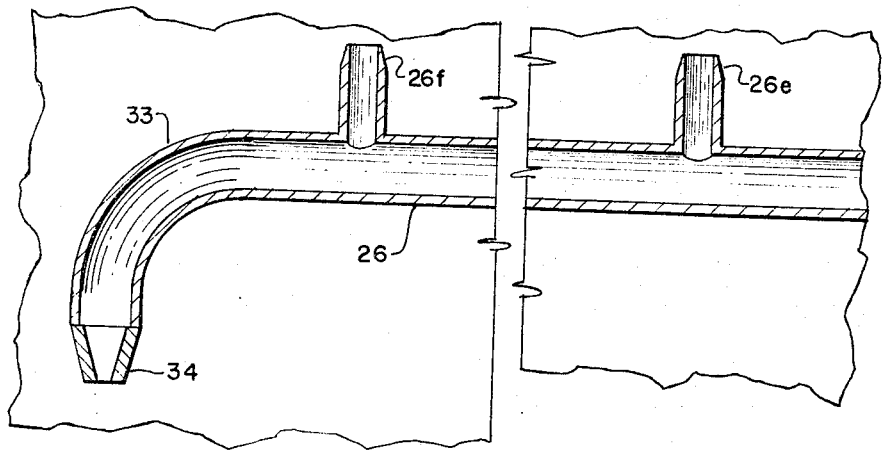
FIG. 3 is an enlarged portion of a section of the invention along lines 3—3 of FIG. 2.
Figure 2:
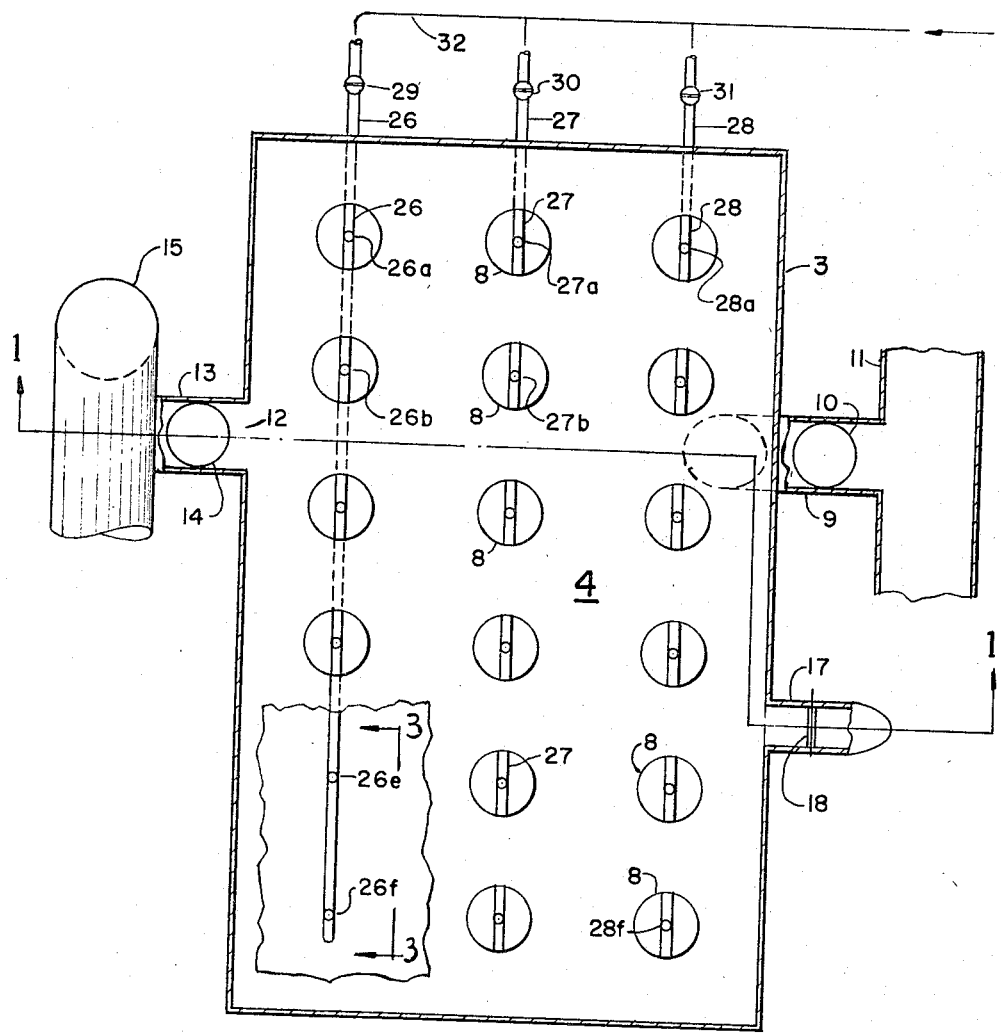
FIG. 2 is a plane view, partially cut-away, taken along lines 2—2 of FIG. 1.

The preferred form of the invention is shown in FIGS. 1–3. These figures illustrate a dust collector filter compartment, generally indicated by 1, comprising a top wall 2 and side walls 3. Extending horizontally across the lower region of the compartment 1 is a partition or crown sheet 4. This crown sheet 4 divides the compartment 1 into an upper chamber 5 and a lower discharge chamber 6. The discharge chamber 6 is formed as a conical hopper having a discharge outlet 7 located at its apex. The crown sheet 4 contains several rows of apertures 8. In communication with the discharge chamber 6 is dusty gas supply pipe 9 having a shut-off valve or damper 10 located therein. Also communicating with the supply pipe 9 is a dirty gas manifold 11. Provided in the compartment 1, above the crown sheet 4, is an outlet 12 for cleaned gas communicating with an exhaust duct 13. Exhaust duct 13 also contains a shut-off valve or damper 14, located therein. The exhaust duct 13 in turn communicates with a clean gas outlet manifold 15, which transports the clean gas from the compartment 1 by the action of exhaust fan 16.

The manifolds 11 and 15 serve a plurality of compartments corresponding to compartment 1 of FIG. 1. Therefore, the flow of dirty gas to the system need not be interrupted, since some of the compartments may be kept in service while others are being cleaned.

Also communicating with the compartment 1 is a reverse air duct 17 having a reverse air damper 18 therein. This air duct 17 enables the upper chamber 5 to be placed in direct communication with the atmosphere when the reverse air damper 18 is opened.

The upper surface of the crown sheet 4, about each aperture 8, is provided with collars 19, or other suitable means of securing bags to the crown sheet. Secured to each bag collar 19, by means of a suitable clamp 20, is the lower end of a filter bag 22. Each filter bag 22 is supported at its upper end by another clamp 23 which is positioned about a closed cap 24. The closed cap 24 is suspended downward from the top wall 2 of compartment 1 by a suitable attaching means 25. Alternatively, the upper ends of the bags may be closed by sewing, instead of by a separate closure or cap. Also, tensioning rings or other suitable means may be substituted.

Extending through the discharge chamber 6 are a plurality of horizontal air header pipes 26, 27 and 28, arranged in parallel relationship with each other immediately below the rows of apertures 8 of crown sheet 4. Each header pipe carries a plurality of identical nozzles. For example, header pipe 26 carries a series of nozzles 26a–26f, extending along its horizontal axis. These nozzles are arranged so that they are immediately adjacent the lower end of each filter bag 22 and are so positioned to direct a volume of gas axially up the interior of the filter bags 22. Each nozzle may have openings in the order of 1/16 or 1/8 of an inch, or greater. As an example, 1/4 inch pipe nipples have been satisfactory as nozzles for twelve inch diameter bags twenty feet long, and 1/8 inch pipe nipples have been suitable for five inch diameter bags of thirteen foot length.

Each header pipe 26, 27 and 28 is provided with a valve 29, 30 and 31, respectively, for controlling the amount of gas passing therethrough which is received from a gas supply source (not shown). It is desirable that the valves 29–31 be as quick-acting as possible, to permit accurate control of the flow of gas therethrough. The gas supply source distributes gas to the header pipes 26, 27 and 28 by means of conduit 32, which is maintained at a pressure of about 40 p.s.i.g. or greater (preferably 70–100 p.s.i.g.), in order to release an appropriate volume charge of gas into the bags 22.

The ends of each header pipe 26, 27 and 28, opposite conduit 32, are bent downwardly, forming an elbow 33 (see FIG. 3) which is directed away from the apertures 8. Each elbow contains a purge nozzle 34, 35 and 36, respectively, which is preferably of a small diameter so as to prevent excessive loss of gas through the purge nozzles. These nozzles 34, 35 and 36 should be designed to contain an opening about one-eighth of an inch or more in diameter. It is not necessary that elbows be provided to direct the nozzles 34, 35 and 36 downwardly, but they should not be directed toward or against the apertures 8.

In the operation of the dust collector illustrated in FIGS. 1–3, a dusty gas is drawn from the dusty gas inlet manifold 11 into the discharge chamber 6 by the action of the exhaust fan 16 in communication with exhaust manifold 15. The dirty gas continues to be drawn from the discharge chamber 6 into the filter bags 22, where the filtering action takes place. The filtered gas drawn through the porous filter bag 22 is routed through both the exhaust duct 13 and exhaust manifold 15 consecutively, for final discharge. The valve 10 is closable for repair work.

As the gas is continuously drawn through the filter bag 22, foreign material (dust, dirt, etc.) accumulates on the inner surface of the filter bag 22, progressively increasing the resistance to additional flow of gas through the bag.

At predetermined intervals, or in response to the accumulation of a predetermined amount of dust deposited on the inside of the filter bags 22, the exhaust damper 14 is closed, thus stopping normal filtering flow in the compartment. The damper 18 is then opened to a predetermined point to place the exteriors of the filter bags 22 in controlled communication with the atmosphere causing a controlled reverse gas flow through the bags to the reduced pressure zone at the inlet manifold 11, to produce a gentle collapse of those bags. If desired, the source of reverse air may be the discharge of the fan, rather than the atmosphere, to provide warmer gases and prevent sudden chilling of the bags.

During the actual circulation of dusty gas from the inlet duct 9 through the exhaust duct 13, a supply of gas is maintained in conduit 32 with valves 29, 30 and 31 closed.

Once the reverse gas flow causes this collapsing of the bags 22, the valves 29, 30 and 31 are opened either simultaneously or in a programmed sequence for predetermined intervals of time. Each valve thus emits a volume of gas from conduit 32 into one of the header pipes 26, 27 and 28 which, in turn, eject a volume charge of gas from each of its associated nozzles 26a–26f, 27a–27f, or 28a–28f upwardly into the lower end of their associated filter bag. Where a great number of bags are located in one compartment, selected groups of nozzles may be used at any given times. As this volume charge rises up through each bag 22, the bag is subjected to a momentary, progressive expansion, that is to say, the diameter of the bag 22 is increased from its collapsed state toward or up to the diameter it normally possesses while it is filtering dirty gas. This progressive expansion of the bag along its entire length effectively dislodges the accumulated filtered material from the bag surface.

Once the volume charge of gas reaches the upper end of the bag 22, it contacts the closure or cap 24, which confines the charge and redirects it back toward the lower end. This technique of redirecting the volume charge of gas is effective to cause a progressive re-distention of the bag, to permit the dislodged filter cake to fall by gravity, and is further effective in assisting gravity by the flushing action of the redirective volume charge. Thus, the foreign material dislodged by both the upward and downward sweeps of the volume charge is removed into the discharge chamber 6. The foreign material then settles by gravity into the bottom of discharge chamber 6 and is finally removed through outlet 7.

Opening of valves 29, 30 and 31 not only directs the flow of gas into header pipes and into nozzles, but also directs part of the gas flow within the header pipes to the purge ports 34, 35 and 36. Thus, gas passes into discharge chamber 6 for the purpose of purging from within the header pipes any foreign debris which may have dropped from within the filter bags 22 and through the nozzles to accumulate within and eventually plug the header pipes 26, 27 and 28.

Preferably, the intensity of the bag-collapsing pressure differential is controlled, by presetting of the "open" position of the reverse flow valve 18, to provide only the light reverse flow against and through the bag which is required for the gentle, but full collapse of the bags. Excesesive or additional "reserve" flow not only causes strain on the bag fabric, but tends to counteract or dampen the effect of the volume charge emitted from the nozzles. Therefore, the intensity of the collapsing reverse flow and the intensity of the volume charge ideally will be correlated with each other to provide the best results for a given installation.

Figure 4:
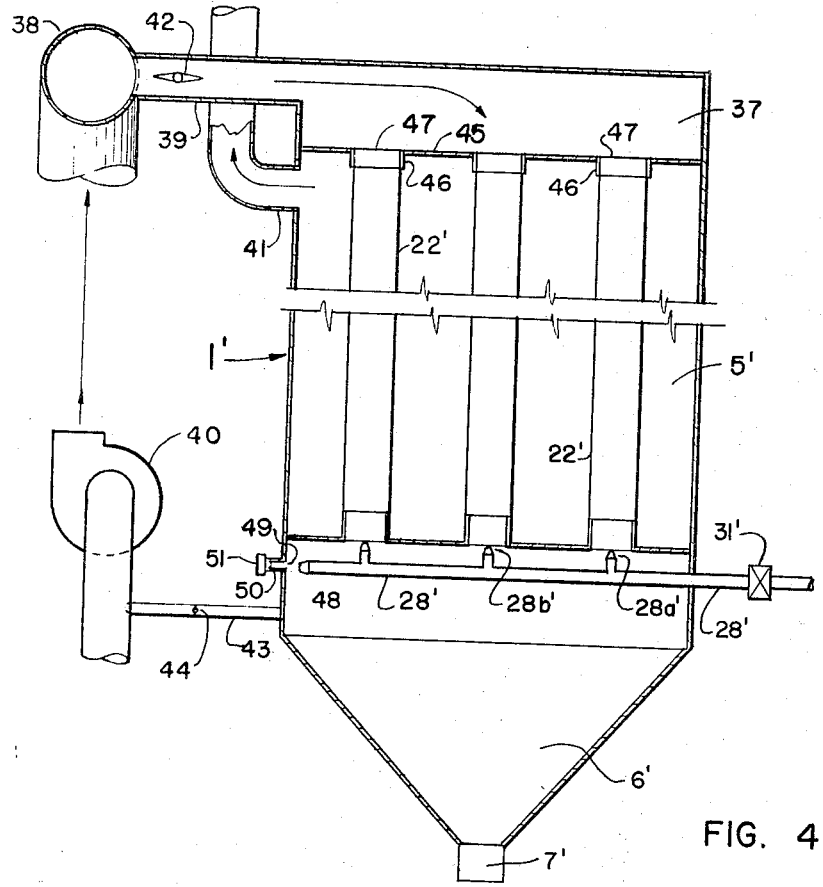
FIG. 4 is a secondary elevation of a modified form of the invention.

FIG. 4 depicts a modified form of the invention in which the same numerals, primed, are used to identify compartments equivalent to those of FIG. 1. The compartment 1' contains a feed chamber 37 arranged above the filter bag chamber 5'. A crown sheet 45 forms the floor of the feed chamber and received the upper ends of the filter bags 22' on a plurality of bag collars 46 surrounding a plurality of apertures 47 therein. The upper ends of the filter bags are open to receive gas and material from the chamber 37.

The feed chamber 37 receives an inlet duct 39, having a damper 42 therein and which leads to a dirty gas manifold 38. The dirty gas is supplied from a source by means of fan 40.

The upper chamber 5' communicates with a clean gas outlet 41 which is opened to the atmosphere. The discharge chamber 6' receives a conduit 43 which has a damper 44 therein. The conduit communicates with the lower pressure zone at the inlet of fan 40. If desired, a separate low pressure source may be used for conduit 43.

The compartment of FIG. 4 has a modified purge nozzle 48 extending from the header pipe 28' toward a wall of the discharge chamber 6'. Opposite the nozzle 48 the wall has an access aperture 49 receiving an access duct 50 which is capped by a cap 51.

In the operation of the invention in its modified form, dirty gas is fed from the manifold 38 through inlet duct 39 and into feed chamber 37, where it is directed down through the filter bags 22'. Clean gas filtered through the bags is forced to atmosphere through the outlet duct 41.

When a predetermined amount of foreign debris accumulates on the inside surface of the bag, or at specific intervals of time, the dirty gas damper 42 is closed and damper 44 is opened a preset amount. A predetermined collapse of the bag then occurs in the same manner as previously described since the atmospheric pressure available through the duct 41 is greater than that of the low pressure at the intake of fan 40. A volume charge of gas is then passed from header pipe 28' through the nozzles 28a'–28c' upwardly into the filter bags 22'. The volume charge is confined by the now closed feed chamber 37 and redirected back down the filter bags 22. In this embodiment of the invention, all filter bags associated with a single chamber 37' preferably will receive their volume charges substantially simultaneously, so that the charges meet the chamber at the same time, and no bags are available to serve as a vent or escape route for the gas, and the charges will be uniformly redirected toward the discharge chamber.

Although the compartments of FIGS. 1 and 3 are shown as being supplied with dirty gas by means of "induced draft" and "forced draft," respectively, it is to be understood that both embodiments may be modified to receive the dirty gas by either forced or induced draft.

Various changes may be made in the details of the invention as described without departing from the scope of the appended claims.

I claim:
1. A dust collector comprising a casing having an inlet and an outlet therein and a partition, said partition having at least one aperture therein, at least one substantially vertical tubular filter bag having its lower end secured about said aperture in the partition, means for supplying a dirty gas to the said inlet, means for removing filtered gas from the outlet, means for periodically interrupting the flow of dirty gas through the inlet, at least one nozzle below the partition aimed substantially vertically through said aperture, means for propelling a volume charge of gas under pressure through the nozzle to pass upwardly through the said aperture and along the interior of the said filter bag toward the upper end thereof, and means at the upper end of the bag to redirect the volume charge downwardly along the bag to remove dislodged dust therewith downwardly through the said aperture.

2. A dust collector as set forth in claim 1, including means for regulating a collapse of the bag.

3. A dust collector as set forth in claim 2, wherein the means for regulating a collapse of the bag comprises a reverse air duct adapted to be in communication with the clean side of said filter bag to provide a reverse flow of clean air through the bag.

4. The dust collector of claim 1 wherein said means for propelling a volume charge of gas carries a conduit for purging dust accumulating therein into the discharge chamber.

5. A dust collector as set forth in claim 1 in which said means for interrupting the supply of dirty gas includes means for causing a reverse flow of clean gas through the filter bags.

6. A dust collector as set forth in claim 5 including means for regulating the intensity of reverse flow and regulating the intensity of the volume charge.

7. A dust collector as set forth in claim 1 in which said partition subdivides this casing into an upper compartment and a lower compartment, and the casing inlet communicates with the lower compartment.

8. A dust collector as set forth in claim 7 in which said redirecting means comprise at least one cap closing the upper end of the filter bag.

9. A dust collector as set forth in claim 7 in which said redirecting means comprise a sewn closure at this upper end of each filter bag.

10. A dust collector as set forth in claim 1 including a second partition having at least one aperture therein and positioned to form a supply chamber above the filter bag, the supply chamber receiving the casing inlet, the upper end of the bag being secured about the said aperture in the second partition, and valve means for closing the supply chamber.

References Cited

UNITED STATES PATENTS

| 3,178,868 | 4/1965 | Gibby | 55—96 |
| 3,217,468 | 11/1965 | O'Dell | 55—303 X |
| 3,256,679 | 6/1966 | Snyder | 55—293 |

HARRY B. THORNTON, *Primary Examiner.*

S. SOKOLOFF, *Assistant Examiner.*